United States Patent

[11] 3,571,709

[72] Inventor Robert M. Gaertner
9315 Queens Lane, Oxon Hill, Md. 20022
[21] Appl. No. 826,548
[22] Filed May 21, 1969
[45] Patented Mar. 23, 1971

[54] DETECTOR FOR MEASURING ICING RATES OVER A PLURALITY OF PERIODS OF TIME
6 Claims, 2 Drawing Figs.

[52] U.S. Cl. .................................................. 324/142, 340/234, 324/71
[51] Int. Cl. .................................................. G01r 7/00, G01n 27/00
[50] Field of Search ................................. 324/71, 68, 70, 142; 244/134 (F); 340/234; 73/170

[56] References Cited
UNITED STATES PATENTS
3,086,393 4/1963 Silverschotz ............... 340/234X FOREIGN PATENTS
772,188 4/1957 Great Britain ............... 244/134(F)

Primary Examiner—Alfred E. Smith
Attorneys—Edgar J. Brower, Arthur L. Branning, T. O. Watson, Jr. and T. J. Madden ABSTRACT: This invention is directed to an icing rate detector. The invention utilizes an icing switch and a heater which are mounted on the outside of an aircraft. When ice forms on the switch, it closes and energizes a heater which then melts the ice and causes the switch to open. The heater thus is cycled on and off when the aircraft is subjected to icing conditions. A rate detecting circuit measures the rate at which power is consumed over a fifteen second period and over a two minute period. These rates are directly proportional to the rate at which ice is formed on the aircraft.

PATENTED MAR 23 1971 3,571,709

INVENTOR
ROBERT M. GAERTNER

BY Thomas O. Watson Jr.
Thomas J. Madden
ATTORNEYS

DETECTOR FOR MEASURING ICING RATES OVER A PLURALITY OF PERIODS OF TIME

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

Ice accumulation on an aircraft can occur at various rates. If the icing rate is light, it presents no immediate problem but sudden changes in atmospheric conditions often precipitate rapid increases in icing rates. If the pilot of the aircraft can determine the rate of accumulation at a given instant, he can take evasive action, when necessary, prior to much actual accumulation of ice and avoid a very hazardous flight condition. This invention is directed to a device which can detect these rates.

2. Description of the Prior Art

Numerous detectors for sensing icing conditions are found in the prior art. These devices, however, do not warn the pilot of rapid accumulation rates, but instead respond to all rates of icing in a similar fashion. In addition, these devices rely on sensitive tuning or differential circuits. These circuits require accurate compensation techniques to be reliable and generally have delicate sensors which can easily be damaged.

SUMMARY OF THE INVENTION

The inventive detector represents a substantial improvement over the prior art. The inventive device provides an indication of the rate of ice accumulation over a long period and a short period. This enables the pilot to make an accurate judgement of icing conditions. The device does not require a delicate sensor or timing circuit and can utilize the air aircraft's deicing system.

The inventive device utilizes a thermoelectric switch which is mounted on the outer surface of an aircraft. When ice forms on the switch it closes a circuit to a heater which then melts the ice on the switch. The operation of the switch is cyclic. A rate detector is connected to the heater and measures the rate at which the heater consumes power. The rate detector measures this rate over a two minute period and over a fifteen second period and feeds them to a display which gives the pilot a visual indication of the two rates. The rates are a direct measure of the rate at which the ice forms on the aircraft.

It is an object of the present invention to provide a new and improved device for detecting the rate at which ice forms on a surface.

It is a still further object of the present invention to provide an icing rate detector which responds to rapid icing rates.

It is a still further object of the present invention to provide an icing rate detector which simultaneously responds to two different icing rates.

It is yet a further object of the present invention to provide an icing rate detector which can utilize the deicing system of an aircraft.

Other objects, advantages and novel features of the invention will become apparent from the following detailed description of the invention when considered in conjunction with the accompanying drawing.

DESCRIPTION OF THE PREFERRED EMBODIMENT

Figure 1:
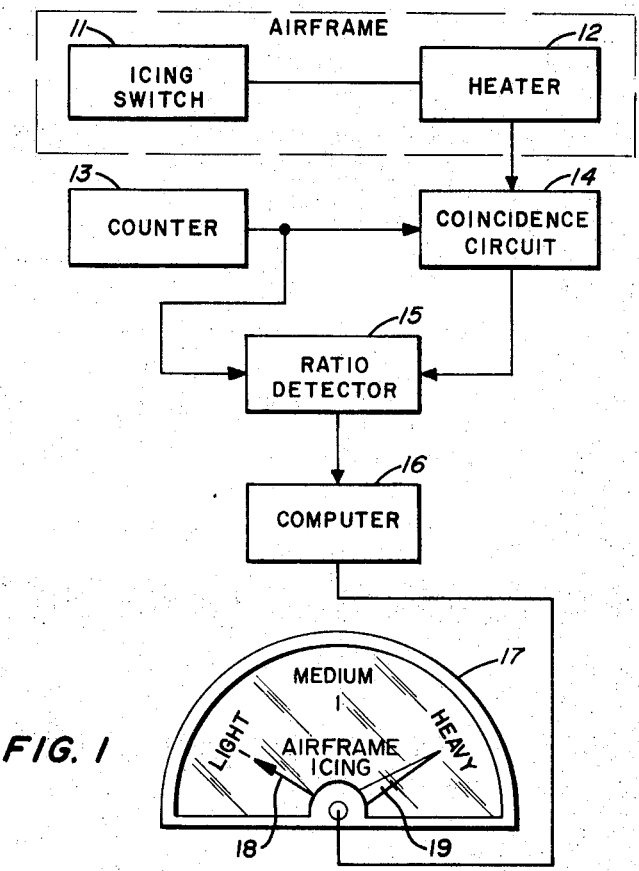
FIG. 1 is a schematic view of the inventive detector.

Referring now to the drawings, the inventive system utilizes a thermoelectric switch 11 which is connected to a heater 12. The heater and switch are both mounted on the outside of the aircraft and the heater may be part of the aircraft's deicing system.

The heater is connected together with a counter 13 to a coincidence circuit 14. The counter and the coincidence circuit are also connected to a ratio detector 15. The output of the ratio detector 15 is coupled to a computer 16 and an indicator 17.

In operation, the thermoelectric switch 11 will close when ice is formed on it and will turn on heater 12. The heater will melt the ice on the switch and cause the switch to open. During light icing conditions, the heater may cycle on and off only once during a finite time interval. In heavier conditions the heater will cycle more frequently while in the heaviest icing conditions the heater will be in continuous operation over the same time period.

Counter 13 provides a continuous known count to the ratio detector 15 and coincidence circuit 14. When the heater is turned on, it gates the coincidence circuit to pass the signal from the counter to the opposite side of the ratio detector. When the heater is turned off, no signal will pass through the coincidence circuit to the ratio detector 15.

FIG. 2a depicts the signal at the output of the heater over a 3 minute period. This output is supplied to the coincidence circuit and the pulses shown occur when the heater is turned on. FIG. 2b shows the pulses supplied by the counter 13 to the ratio detector and the coincidence circuit and FIG. 2c shows the output of the coincidence circuit when the heater signals, shown in FIG. 2b, are applied to it.

The ratio detector 15 receives the pulses from the coincidence circuit 14 and the counter 13 and provides a signal which is proportional to the ratio of the two pulse rates. The signal is generally a linear signal. One circuit which could be utilized is shown in U.S. Pat. No. 3,040,983, issued to J. E. Bigelow, on Jun. 26, 1962.

When the ratio of the signals applied to detector 15 approaches one, the heater will be on almost continually [$t_o$ to ($t_o-1$ minute) FIG. 2a]. This is indicative of heavy icing conditions. When the ratio approaches zero, the heater will be on for only a short period of time [($t_o+1$ minute) to ($t_o+2$ minutes)] and this indicates light icing conditions.

The output of the ratio detector is supplied to the computer which averages the signal over two finite time periods. Generally, the signal will be averaged over a 2 minute period and over a 15 second period. The 2 minute average signal controls one pointer 19 of the gauge 17 and the 15 second average signal controls the other pointer 18. The computer updates the averaged signals so as to provide an output which is representative of the preceding 15 seconds.

The output of the ratio detector could also be connected to an oscilloscope with a 2 minute and 15 second sweep. The output of the ratio detector could then be shown directly on the face of a cathode-ray tube associated with the oscilloscope.

With the inventive arrangement, the pilot can see the icing rate over two distinct periods of time. Using this information the pilot can make an accurate determination as to prosecution of a deviation from his flight plan.

Figure 2:
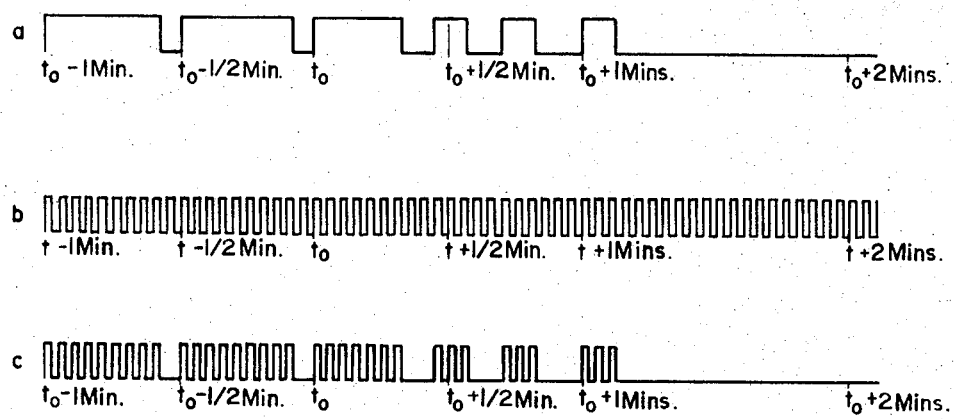
FIG. 2 shows the waveforms at various points in the inventive circuit.

The advantages of providing two pulse rates can be seen in FIG. 2. Thus, if the plane were at the $t_o$ plus 1 minute point, FIG. 2, the 15 second signal would tell the pilot that the plane was being subjected to icing. The pilot would then compare this with the 2 minute signal and see that the icing was very light for that period of time. At this point, there would be no need to deviate from his flight plan.

When the plane is at the $t_o$ point the pilot can see that the icing rate is low for the 2 minute period. The icing rate for the last 15 seconds, however, is very high and the 15 second signal warns the pilot of the increased rate of ice accumulation. The 15 second signal gives the pilot ample time to determine if he should change his flight plan.

Heavy icing conditions often exist for only short distances and the pilot may choose to continue his flight plan. If he proceeds to the $t$ minus 15 second point, he will observe that the 15 second signal will still indicate a heavy icing rate and the two minute signal will be increasing. At this point there will not be a substantial accumulation of ice on the aircraft and the pilot can still deviate from his flight plan and avoid the dangers of icing. This option was not available with prior icing rate detectors.

Thus, it is seen that a new and improved icing rate detector has been provided. The detector provides information for two different time periods and enables the pilot to make a more accurate determination of the actual icing conditions.

It should be understood that the above description is made by way of example and is not intended as a limitation of the scope of the invention. Thus, for example, the timing period for the two rate signals could be varied for the speed of the plane it is utilized with.

Obviously many modifications and variations of the present invention are possible in the light of the above teachings.

I claim:

1. An icing rate detector comprising:
power consuming means for removing ice from a surface;
means for measuring in two finite periods of time the rate at which said power consuming means utilizes power; and
display means for providing an indication of the rate measured in both of said finite periods of time by said means for measuring.

2. An icing rate detector as in claim 1 in which said means for measuring the rate utilizes a counter.

3. An icing rate detector as in claim 2 wherein:
said means for measuring the rate further comprises gating means connected to be gated by said power consuming means;
counting means connected to said gating means; and
ratio means connected to receive the outputs of said counting means and said gating means and operable to provide an output which is proportional to the ratio of the outputs of said counting means and said gating means.

4. An icing rate detector as in claim 3 further comprising computing means connected to receive the output of said ratio means to average it over said two finite periods of time.

5. An icing rate detector as in claim 4 wherein said power consuming means comprises a heater and a switch mounted on said surface, said switch being responsive to the formation of ice to turn on said heater.

6. An icing rate detector as in claim 5 wherein said heater and switch are part of the deicing system of an aircraft.